US011526212B1

(12) United States Patent
Yang et al.

(10) Patent No.: US 11,526,212 B1
(45) Date of Patent: Dec. 13, 2022

(54) SYSTEM TO DETERMINE DON/DOFF OF WEARABLE DEVICE

(71) Applicant: AMAZON TECHNOLOGIES, INC., Seattle, WA (US)

(72) Inventors: Jung Sik Yang, San Jose, CA (US); Pierre Djinki, San Francisco, CA (US); Alfred Ying Fai Lui, San Jose, CA (US); Tony Yuan, Cupertino, CA (US); Scott Michael Shill, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 371 days.

(21) Appl. No.: 16/711,343

(22) Filed: Dec. 11, 2019

Related U.S. Application Data

(60) Provisional application No. 62/905,534, filed on Sep. 25, 2019.

(51) Int. Cl.
*G06F 3/01* (2006.01)
(52) U.S. Cl.
CPC .............. *G06F 3/017* (2013.01); *G06F 3/012* (2013.01)
(58) Field of Classification Search
CPC ........... G06F 1/3231; G06F 3/011–013; G06F 3/017; G06F 3/038; G06F 1/163; G02B 27/017; G02B 2027/0178; H03K 17/955; H04W 4/027
See application file for complete search history.

(56) References Cited

U.S. PATENT DOCUMENTS

| 8,223,024 | B1* | 7/2012 | Petrou | H04W 12/33 |
| | | | | 340/573.7 |
| 8,907,867 | B2* | 12/2014 | Wong | G06F 1/3231 |
| | | | | 379/430 |
| 8,958,158 | B1* | 2/2015 | Raffle | G02B 27/0172 |
| | | | | 359/630 |
| 9,204,397 | B2* | 12/2015 | Raffle | H04W 52/0254 |
| 9,264,803 | B1* | 2/2016 | Johnson | H04R 3/00 |

(Continued)

OTHER PUBLICATIONS

Brychta, Michal, "Measure Capacitive Sensors With a Signma-Delta Modulator", Electronic Design, Apr. 28, 2005, Retrieved from the Internet: https://www.electronicdesign.com/analog/measure-capacitive-sensors-sigma-delta-modulator.

(Continued)

*Primary Examiner* — Patrick F Marinelli
(74) *Attorney, Agent, or Firm* — Lindauer Law, PLLC

(57) ABSTRACT

Operation of a head-mounted wearable device is responsive to whether a state of the device is being worn (donned) or not worn (doffed) on the head. The device may operate in a first mode while donned and a second mode while doffed. A capacitive sensor device having an electrode positioned in a bridge of the device provides output data. The output data is processed to determine a baseline value. Later, acquired output data is compared to the baseline value to determine don/doff data indicative of whether the device is donned or doffed. Data from other sensors, may also be used in conjunction with the output data to improve accuracy of the don/doff data. For example, if the output data is above the baseline value and accelerometer data is indicative of motion greater than a motion threshold, the don/doff data may be designated as donned.

20 Claims, 8 Drawing Sheets

(56) References Cited

U.S. PATENT DOCUMENTS

| | | | | |
|---|---|---|---|---|
| 9,998,817 B1* | 6/2018 | Liu | ............... | H04R 1/1041 |
| 10,133,358 B1* | 11/2018 | Chen | ............... | G06F 3/165 |
| 10,168,555 B1* | 1/2019 | Cazalet | ............... | G02C 1/10 |
| 10,345,902 B1* | 7/2019 | Yildiz | ............... | G06V 40/197 |
| 10,750,302 B1* | 8/2020 | Zhong | ............... | H04R 1/1041 |
| 11,062,572 B1* | 7/2021 | Zhang | ............... | G08B 21/18 |
| 11,089,416 B1* | 8/2021 | Zhong | ............... | H04R 29/004 |
| 2011/0194029 A1* | 8/2011 | Herrmann | ............... | H04N 13/398 |
| | | | | 348/569 |
| 2012/0056847 A1* | 3/2012 | Milford | ............... | G02B 27/017 |
| | | | | 345/174 |
| 2012/0133884 A1* | 5/2012 | Ishida | ............... | G02B 30/24 |
| | | | | 351/158 |
| 2013/0249849 A1* | 9/2013 | Wong | ............... | G06F 1/3231 |
| | | | | 345/174 |
| 2014/0375680 A1* | 12/2014 | Ackerman | ............... | G06F 3/012 |
| | | | | 345/633 |
| 2015/0094142 A1* | 4/2015 | Stafford | ............... | G06F 3/0304 |
| | | | | 463/31 |
| 2015/0156716 A1* | 6/2015 | Raffle | ............... | G02B 27/0101 |
| | | | | 250/206 |
| 2016/0189429 A1* | 6/2016 | Mallinson | ............... | H04N 13/398 |
| | | | | 345/633 |
| 2016/0253487 A1* | 9/2016 | Sarkar | ............... | H04W 12/33 |
| | | | | 726/7 |
| 2017/0061647 A1* | 3/2017 | Starner | ............... | G06V 40/67 |
| 2017/0160394 A1* | 6/2017 | Johnson | ............... | G01S 15/04 |
| 2017/0280394 A1* | 9/2017 | Kim | ............... | H04M 1/73 |
| 2018/0227412 A1* | 8/2018 | Xian | ............... | G06F 21/12 |
| 2018/0247676 A1* | 8/2018 | Raphael | ............... | H04N 21/4394 |
| 2018/0348547 A1* | 12/2018 | Rousseau | ............... | G02B 27/0172 |
| 2019/0243599 A1* | 8/2019 | Rochford | ............... | G06F 3/147 |
| 2019/0302484 A1* | 10/2019 | Zhang | ............... | A61B 90/50 |
| 2020/0065569 A1* | 2/2020 | Nduka | ............... | G06V 40/20 |
| 2020/0400962 A1* | 12/2020 | Hirano | ............... | G02B 13/0095 |
| 2021/0157402 A1* | 5/2021 | Parshionikar | ............... | G06F 3/014 |
| 2021/0271861 A1* | 9/2021 | Nduka | ............... | G02B 27/017 |
| 2022/0163806 A1* | 5/2022 | Chaum | ............... | G02B 27/0093 |
| 2022/0179484 A1* | 6/2022 | Youn | ............... | G02B 27/0093 |

OTHER PUBLICATIONS

Cypress Embedded in Tomorrow, "AN85951", PSoC 4® and PSoC 6 MCU Cap Sense® Design Guide, Document No. 001-85951 Rev., Retrieved from the Internet: https://www.cypress.com/file/46081/download.

Mozek et al., "Digital Temperature Compensation of Capacitive Pressure Sensors", Laboratory of Microsensor Structures and Electronics (LMSE), Faculty of Electrical Engineering, University of Ljubljana, Ljubljana, Slovenia, ISSN0352-9045, 2010, Retrieved from the internet:http://www.midem-drustvo.si/Journal%20papers/MIDEM_40(2010)1p38.pdf.

Podbelski, Aaron GL, "Cypress Semiconductor White Paper", Cypress's CapSense Sigma-Delta Algorithm, Cypress Perform, Document No. 001-41925 Rev., Nov. 13, 2007, Retrieved from the Internet:https://www.cypress.com/file/73326/download.

Sigma_Delta Modulation,"A journey of a thousand miles begins with one step", Nov. 17, 1999, Retrieved from the internet: https://www.clear.rice.edu/elec301/Projects99/adda/sdmod.html.

* cited by examiner

US 11,526,212 B1

SYSTEM TO DETERMINE DON/DOFF OF WEARABLE DEVICE

PRIORITY

This application claims priority to, and the benefit of, U.S. patent application Ser. No. 62/905,534 filed on Sep. 25, 2019, titled "System to Determine Don/Doff of Wearable Device". The entirety of the contents of that application are hereby incorporated by reference into the present disclosure.

BACKGROUND

Wearable devices provide many benefits to users, allowing easier and more convenient access to information and services. At different times, a wearable device may be worn (donned) by the user or not worn (doffed).

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
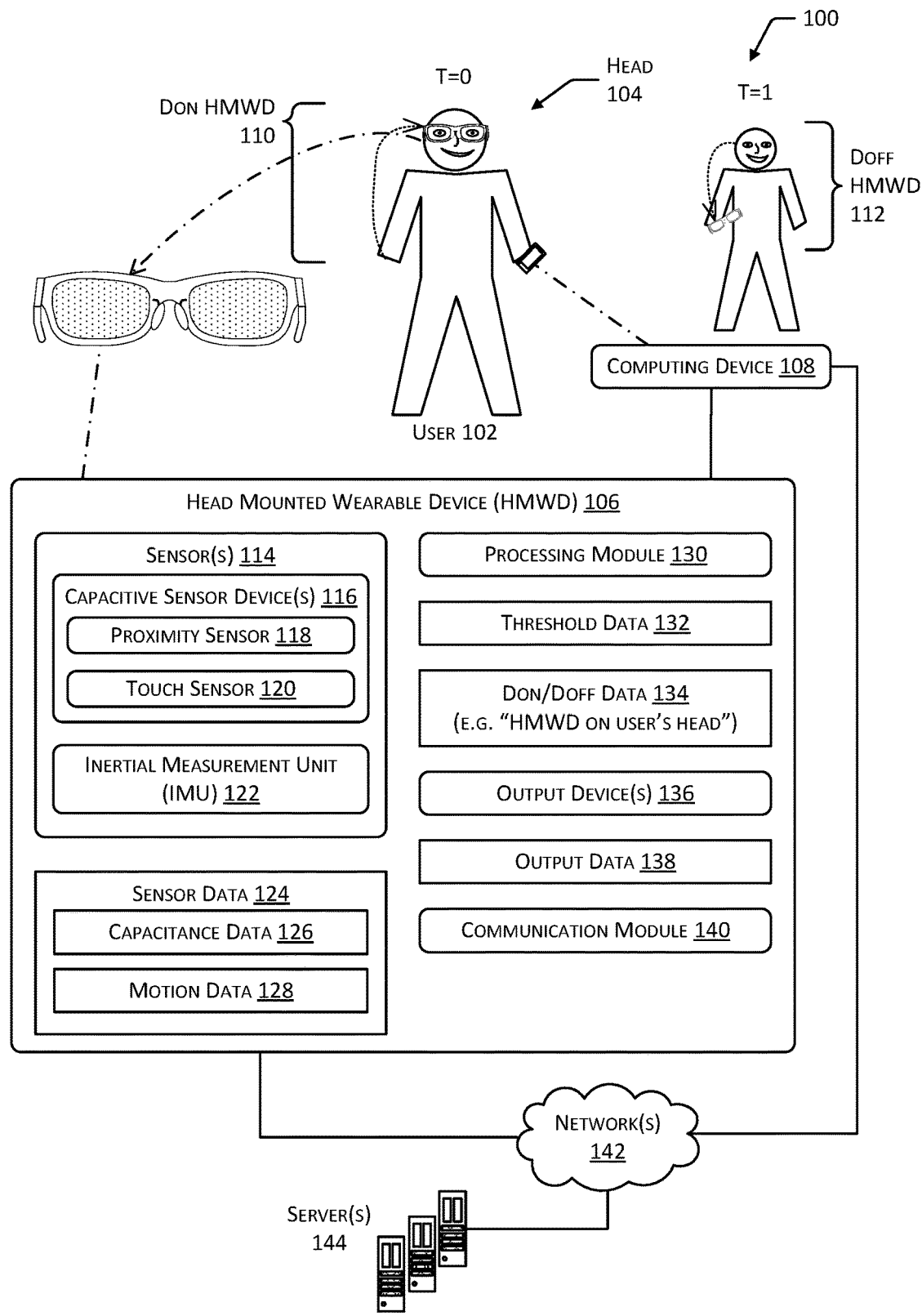
FIG. 1 depicts a system including a head-mounted wearable device with sensors to determine if the device is donned or doffed, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations, the scale of a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) in a form factor of eyeglasses may provide a ubiquitous and easily worn device that facilitates access to information.

The HMWD may operate independently as a standalone device or may operate in conjunction with another computing device. For example, the HMWD may operate in conjunction with a smartphone, tablet, network service operating on servers, and so forth. The HMWD includes sensors and output devices that provide a user interface to the user. In one implementation, the HMWD may use the computing device to provide access to a wide area network, compute resources, data storage, a display for image output, and so forth.

The HMWD may be worn (donned) on the head or not worn (doffed) on the head by the user at different times. For example, the HMWD may be donned during the day and doffed at night prior to sleep. During the day, the user may don or doff the HMWD for various reasons or for various purposes.

Information about whether the HMWD is donned or doffed may be used in a variety of ways. For example, when doffed, the HMWD may be placed into a very low power or "sleep" mode to reduce power consumption, thus improving overall battery life. In another example, when doffed the HMWD may operate sensors in an alternative mode, such as transitioning a microphone to a far-field mode to support acquisition of speech from farther away. In yet another example, when donned, status information about the HMWD being worn may be presented to other users, such as letting them know the user is wearing the HMWD and is available for communication.

Sensors associated with the HMWD provide sensor data that may be used to determine don/doff data. The don/doff data provides information indicative of the current state of wear of the HMWD. For example, don/doff data may indicate if the HMWD is being worn or not being worn at a particular time.

A determination of don/doff data from a single sensor may be incorrect in some circumstances. For example, output from one sensor may change during use as the HMWD moves the device with respect to the user, as the user sweats, and so forth. An incorrect determination of don/doff data may adversely affect operation of the HMWD. For example, if the HMWD has been doffed but does not recognize that state and enter a "sleep" mode, electrical power is consumed from the battery without providing functionality to the user. Likewise, if the HMWD has been donned but does not recognize that state, it may not resume a "wake" mode to provide typical functionality to the user. As a result, accurate determination of don/doff data may be very useful in operating the HMWD.

Described in this disclosure are devices and techniques to acquire data from two or more sensors of the HMWD and determine don/doff data. The HMWD includes one or more capacitive sensor devices. A capacitive sensor device includes an electrode and capacitive sensor circuitry. During operation, the capacitive sensor device detects changes in capacitance at the electrode that result from the dielectric nature of objects such as a human body. The capacitive sensor circuitry generates capacitance data that is indicative of the capacitance at an electrode at a given time. In one implementation, a first electrode is placed within a frame bridge of the HMWD. During normal wear, the frame bridge of the HMWD is proximate to a nasal bridge of the user, and may be proximate to the nasion of the user's skull.

During wear it is possible for the HMWD to move relative to the user's skull. For example, while being donned, the HMWD may slide down the nasal bridge, placing the frame bridge farther from the nasion and closer to tip of the user's nose. This change in position may result in capacitance changes at the first electrode in the frame bridge to be indicative of the HMWD being doffed, when the HMWD is actually still on the user's head.

The HMWD also includes an inertial measurement unit (IMU). The IMU provides as output motion data that is indicative of movement of the HMWD. For example, the IMU may include three accelerometers arranged along mutually orthogonal axes, to detect movement in three dimensions. The motion data may include movements associated with the user as they move their head, walk, drive, and so forth. The specific movements associated with donning and doffing the HMWD may include a peak in measured acceleration, as the HMWD is moved from the head to another location, such as in the user's pocket or on a table.

By combining the capacitance data and the motion data, accurate don/doff data is determined. In one implementation a doff may be determined if, during a first time interval, capacitance values in the capacitance data decrease to below a first threshold value and there is also a peak of measured acceleration that exceeds a second threshold value. Likewise, the HMWD may be determined to still be donned if the capacitance values decrease below the first threshold but no acceleration peak is observed.

In another implementation the don/doff data may be determined using a pattern recognition system, such as a trained neural network or other machine learning system. For example, a neural network may be trained using the capacitance data and the motion data to recognize the don or doffed states, the actions of donning or doffing, and so forth. In another implementation a finite state machine may be used to determine the don or doffed states.

To further improve performance, the capacitive sensor circuitry may be operated to minimize errors due to environmental factors, such as changes in temperature. For example, capacitive sensor circuitry that uses a sigma-delta modulator may be operated to oversample and gather capacitance values at different sensitivity levels which are then combined. This technique keeps the resulting input signals of respective samples within a linear range of an analog to digital converter (ADC). This eliminates dead zones in the output data, where changes in capacitance would otherwise not result in a change to the capacitance values, improving responsiveness of the system.

In some implementations, other sensors or techniques may be combined. For example, a magnetic sensor in the temple of the HMWD may be used to detect a magnet in a front frame when the temples are folded (closed). The sensor data from the magnetic sensor may be indicative of whether the temples are folded (closed) or unfolded (open). This sensor data may be combined to further improve the determination of the don/doff data. For example, if the magnetic sensor is indicative of the magnet being detected and the capacitive sensor indicates capacitance values less than the threshold, the HMWD may be deemed to be doffed.

By using the don/doff data, overall performance of the HMWD and associated systems are improved. For example, when doffed the device may be placed into a low power mode and extending battery life. When donned, the device may provide status information to other services, such as indicating the device is available for use. This improves the overall efficiency of systems that interact with the HMWD by providing them with reliable information as to whether the HMWD is being worn, which facilitates operations such as presenting output to the user, establishing communication with the user by way of the HMWD, and so forth. Information security is also improved by the don/doff data. For example, if the don/doff data indicates that the HMWD has been doffed, the HMWD may be locked to prevent unauthorized access.

ILLUSTRATIVE SYSTEM

FIG. 1 depicts a system 100 in which a user 102 is wearing on their head 104 a head-mounted wearable device (HMWD) 106 in a general form factor of eyeglasses.

The HMWD 106 may be in communication with one or more affiliated computing devices 108. For example, the HMWD 106 may wirelessly communicate with the computing device 108 using Bluetooth. The computing device 108 may be used at least in part to provide additional resources, such as access to the network, compute resources, storage, display output, and so forth. The computing devices 108 may comprise a smart phone, tablet, local server, in vehicle computer system, and so forth. For example, the computing device 108 may comprise a smart phone that includes a display. The display of the computing device 108 may be used to present a graphical user interface.

Depicted is the same user 102 at two times, time T=0 and T=1. At T=0, the user 102 has placed the HMWD 106 on their head 104, donning 110 the HMWD 106. At T=1, the user 102 has removed the HMWD 106 from their head 104, doffing 112 the HMWD 106.

The HMWD 106 may include or be in communication with one or more sensors 114. The sensors 114 may comprise capacitive sensor devices 116 such as proximity sensors 118 or touch sensors 120, inertial measurement units (IMU) 122, and so forth. The sensors 114 may generate sensor data 124. For example, the capacitive sensor device(s) 116 may generate capacitance data 126 while the IMU 122 generates motion data 128.

The sensor data 124 may include or be associated with one or more timestamps. For example, a set of capacitance values in the capacitance data 126 may be associated with a timestamp.

The capacitive sensor device(s) 116 may comprise one or more electrodes or electrode arrays that are connected to capacitive sensor circuitry. For example, the capacitive sensor circuitry may comprise a programmable system-on-a-chip (PSOC) such as the CY8C4146FNI-S433 from Cypress Semiconductor Corporation of San Jose, Ca. In one implementation, the proximity sensor 118 may comprise a first electrode that is placed proximate to a frame bridge of the HMWD 106. The first electrode may be connected to the capacitive sensor circuitry and operates as a proximity sensor 118, to determine if an object such as the head 104 is near the first electrode. The electrode array may be placed proximate to an exterior surface of a temple of the HMWD 106 and operated as a touch sensor for use by the user 102. In some implementations at least a portion of the same circuitry may operate more than one electrode. For example, the CY8C4146FNI-5433 may be used to operate the proximity sensor 118 using the first electrode in the front bridge and a second electrode in the temple.

The IMU 122 provides information about the movement of the HMWD 106 in space. For example, the IMU 122 may comprise one or more accelerometers, gyroscopes, and so forth. In one implementation, the IMU 122 may comprise three accelerometers, with each accelerometer oriented orthogonal to the others. The IMU 122 may include one or more gyroscopes or gyrometers that sense rotation about one or more mutually orthogonal axes. The IMU 122 may produce motion data 128. For example, the motion data 128 may comprise digital data indicative of a vector value such as an axis, direction, and magnitude of an acceleration.

A processing module 130 may utilize the sensor data 124 from one or more the sensors 114 and threshold data 132 to determine don/doff data 134. For example, the processing module 130 may compare capacitance values in the capacitance data 126 and acceleration values in the motion data 128 with threshold values to determine the don/doff data 134. The processing module 130 may implement one or more of the techniques described herein to determine the don/doff data 134. For example, various techniques are described with regard to FIGS. 4-7.

The don/doff data 134 provides information indicative of whether the HMWD 106 is donned 110 or doffed 112. For example, the don/doff data 134 may comprise a single bit binary value in which a "0" indicates a doffed 112 condition in which the HMWD 106 is not worn on the head and a "1" indicates a donned 110 condition in which the HMWD 106 is worn on the head. The don/doff data 134 may also include a timestamp. The timestamp may be indicative of a time associated with the acquisition of the data used to make the determination.

In some implementations the processing module 130 may be implemented at least in part in the capacitive sensor circuitry. For example, one or more functions associated with the processing module 130 may execute on the PSOC that operates the proximity sensor 118.

The HMWD 106 may include one or more output devices 136 to generate output that may be perceived by the user 102. For example, the output devices 136 may include air conduction speakers (ACS), visual indicator devices, and so forth. Output data 138 is provided to the output device 136 to generate the output. For example, the output data 138 may comprise a pulse code modulated (PCM) stream of audio data that is provided to the ACS output device 136 for presentation.

A communication module 140 may be configured to establish communication with other devices. The communication module 140 may use one or more communication interfaces to establish communication with the other devices via one or more networks 142. For example, the network 142 may comprise a personal area network, local area network, metropolitan area network, wide area network, and so forth. The HMWD 106 may use the networks 142 to access one or more services that are provided by the other devices. For example, the HMWD 106 may establish communication with one or more servers 144. These one or more servers 144 may provide one or more services, such as automated speech recognition, information retrieval, messaging, and so forth.

The communication module 140 may also be used to establish communications with one or more other users 102. This communication may be based at least in part on the don/doff data 134. For example, the user 102(1) of the HMWD 106(1) may initiate a real time call (RTC) with the user 102(2) (not shown) who is determined to be wearing a HMWD 106(2) based on the don/doff data 134 from that device. Audio associated with the RTC may be transferred using the network 142. Management of the call may be facilitated by one or more services executing on the one or more servers 144.

While the HMWD 106 is described in the form factor of eyeglasses, the HMWD 106 may be implemented in other form factors. For example, the HMWD 106 may comprise a device that is worn behind an ear of the user 102, on a headband, as part of a necklace, and so forth. In some implementations, the HMWD 106 may be deployed as a system, comprising several devices that are in communication with one another.

The structures depicted in this and the following figures are not necessarily according to scale. Furthermore, the proportionality of one component to another may change with different implementations. In some illustrations, the size of one structure may be exaggerated with respect to another to facilitate illustration, and not necessarily as a limitation.

Figure 2A:
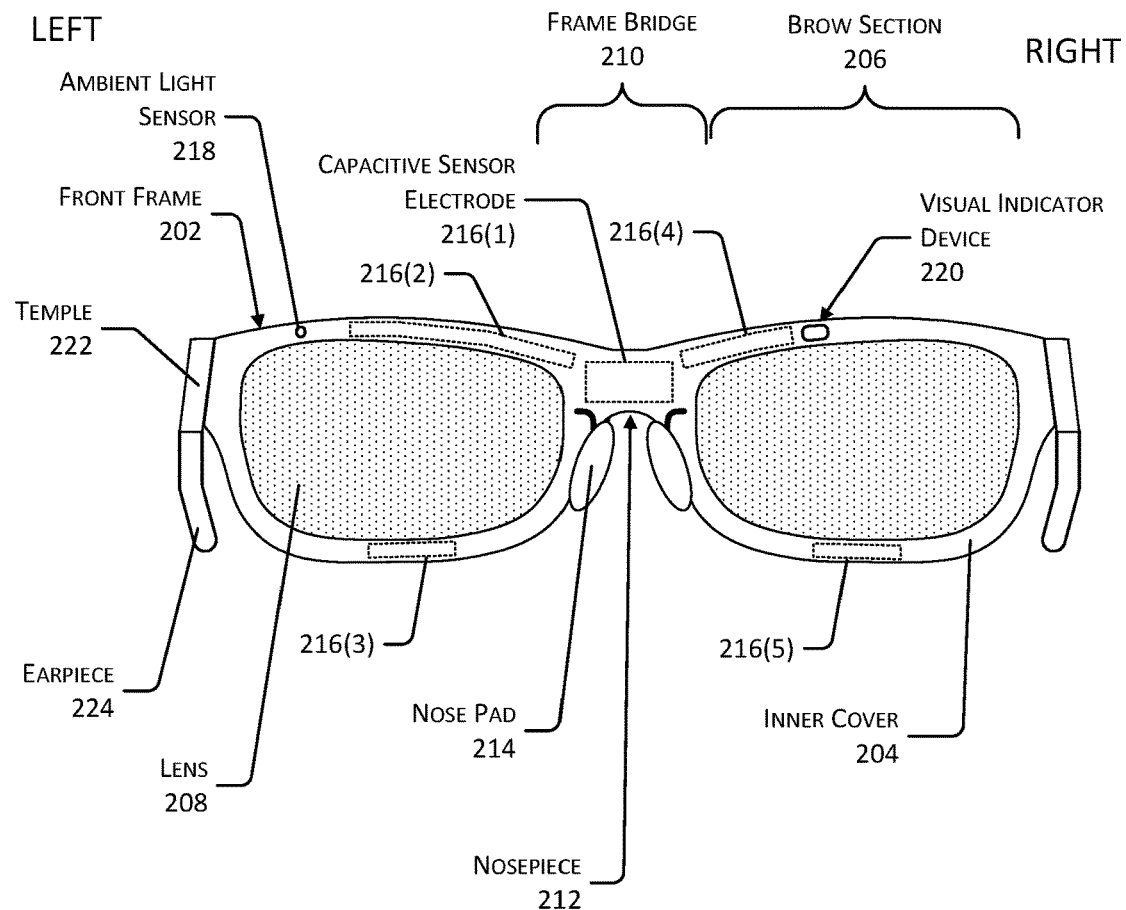
FIGS. 2A and 2B depict views of a head-mounted wearable device, according to some implementations.
Figure 2A:
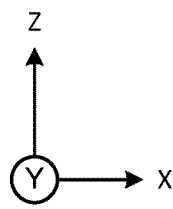

FIG. 2A depicts a view 200 of a HMWD 106, according to some implementations. This view is from the point of view of a user 102.

The HMWD 106 comprises a front frame 202. The front frame 202 may comprise cavities or spaces for various devices. An inner cover 204 is arranged on an interior side of the front frame 202 and closes or conceals those cavities or spaces. The inner cover 204 may be affixed to the front frame 202 by way of mechanical interference fit, fasteners, adhesives, and so forth.

The front frame 202 may include a left brow section 206(L) and a right brow section 206(R). Each brow section 206 may include a lens 208. A frame bridge 210 joins the left brow section 206(L) and the right brow section 206(R).

In some implementations, the front frame 202 may comprise a single piece of material, such as a metal, plastic, ceramic, composite material, and so forth. For example, the front frame 202 may comprise 6061 aluminum alloy that has been milled to the desired shape and to provide space for devices within. In another example, the front frame 202 may comprise injection molded plastic. In other implementations, the front frame 202 may comprise several discrete pieces that are joined together by way of mechanical engagement features, welding, adhesive, and so forth.

The lenses 208 may have specific refractive characteristics, such as in the case of prescription lenses. The lenses 208 may be clear, tinted, photochromic, electrochromic, and so forth. For example, the lenses 208 may comprise plano (non-prescription) tinted lenses to provide protection from the sun. In some implementations, only a single lens 208 may be installed, or the lenses 208 may be omitted.

A nosepiece 212 may be affixed to the frame bridge 210. One or more nose pads 214 may be affixed to, or integral with, the nosepiece 212. The nose pads 214 aid in the support of the front frame 202 and may improve comfort of the user 102.

The HMWD 106 may include one or more capacitive sensor electrodes 216. For example, the capacitive sensor electrode 216 may comprise an electrically conductive area arranged on a substrate such as a flexible printed circuit. A first capacitive sensor electrode 216(1) may be proximate to the frame bridge 210. The first capacitive sensor electrode 216(1) may be affixed to one or more of the front frame 202, the inner cover 204, or other structure of the HMWD 106.

In some implementations additional capacitive sensor electrodes 216 may be present in the HMWD 106. For example, one or more of a second capacitive sensor electrode 216(2) may be located above the left brow section 206(L), a third capacitive sensor electrode 216(3) located below the left brow section 206(L), a fourth capacitive sensor electrode 216(4) may be located above the right brow section 206(R), or a fifth capacitive sensor electrode 216(5) may be located below the right brow section 206(R).

The inner cover 204 includes one or more openings to provide for operation of an ambient light sensor 218, to provide for visibility of a visual indicator device (VID) 220, and so forth. The ambient light sensor 218 provides information on ambient light levels. The VID 220 may comprise one or more light-emitting diodes, quantum dots, incandescent lamps, electroluminescent materials, and so forth. When activated, a VID 220 may emit light. In other implementations the VID 220 may comprise a liquid crystal element, electrophoretic element, interferometric element, cholesteric element, or other device to change appearance as viewed in ambient light.

One or more VIDs 220 may be positioned within the field of view of the user 102 while the HMWD 106 is worn on the head 104. For example, one or more VIDs 220 may be arranged just above one or both lenses 208 of the HMWD 106.

The opening may provide a passage through which illumination produced by the VID 220 may be emitted. In some implementations, instead of or in addition to an opening, the inner cover 204 may be translucent, transparent, or include a window through which the light from the VID 220 is visible to the user 102. For example, the inner cover 204 may comprise translucent plastic that transmits at least a portion of the light emitted by a light of the VID 220.

Figure 3:
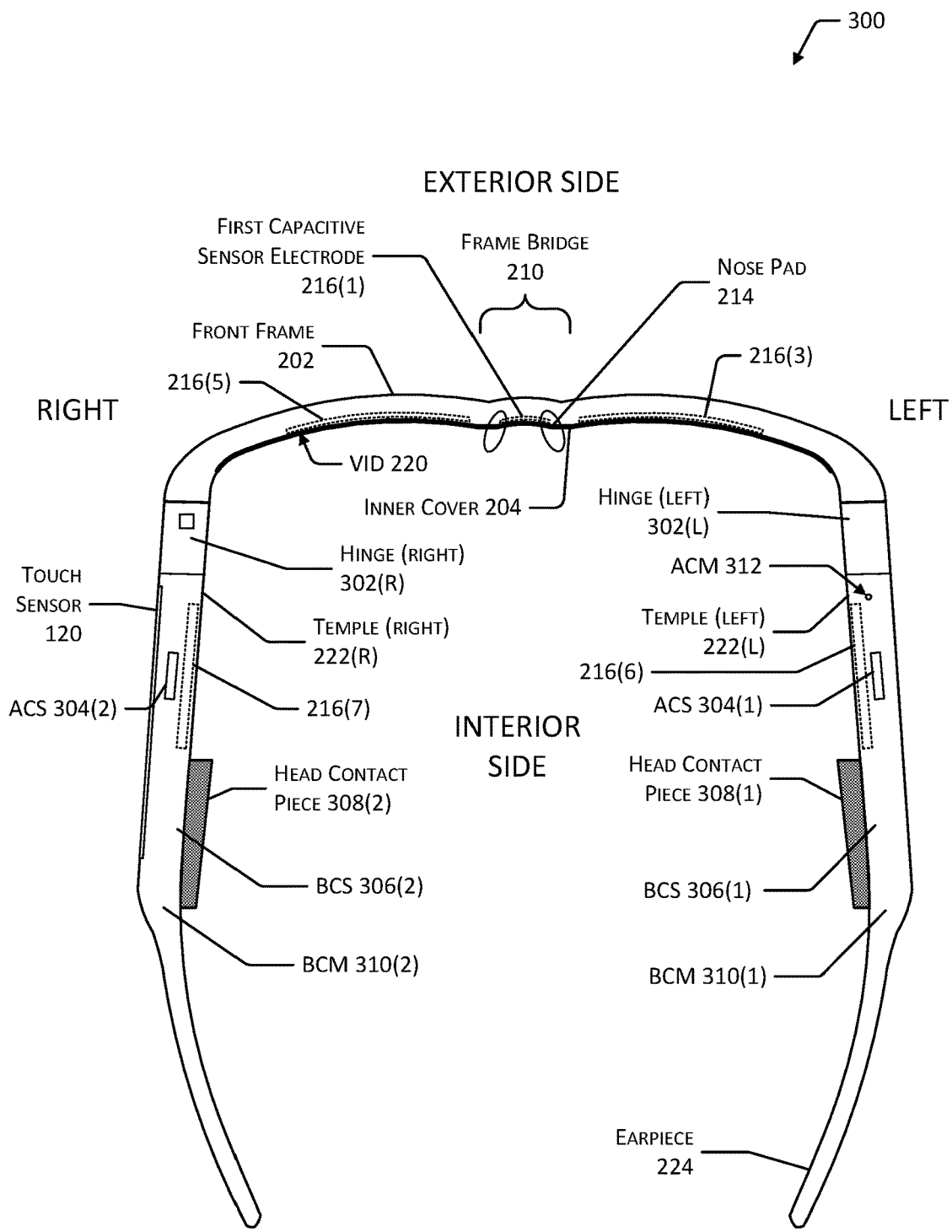
FIG. 3 depicts an exterior view, from below, of the head-mounted wearable device in an unfolded configuration, according to some implementations.

One or more temples 222 may couple to the front frame 202. For example, a temple 222 may be attached to the front frame 202 via a hinge. The temples 222 are depicted in FIG. 3.

An earpiece 224 may extend from a portion of the temple 222 that is distal to the front frame 202. The earpiece 224 may comprise a material that may be reshaped to accommodate the anatomy of the head 104 of the user 102. For example, the earpiece 224 may comprise a thermoplastic that may be warmed to a predetermined temperature and reshaped. In another example, the earpiece 224 may comprise a wire that may be bent to fit. The wire may be encased in an elastomeric material. The temples 222 are depicted in FIG. 3.

Figure 2B:
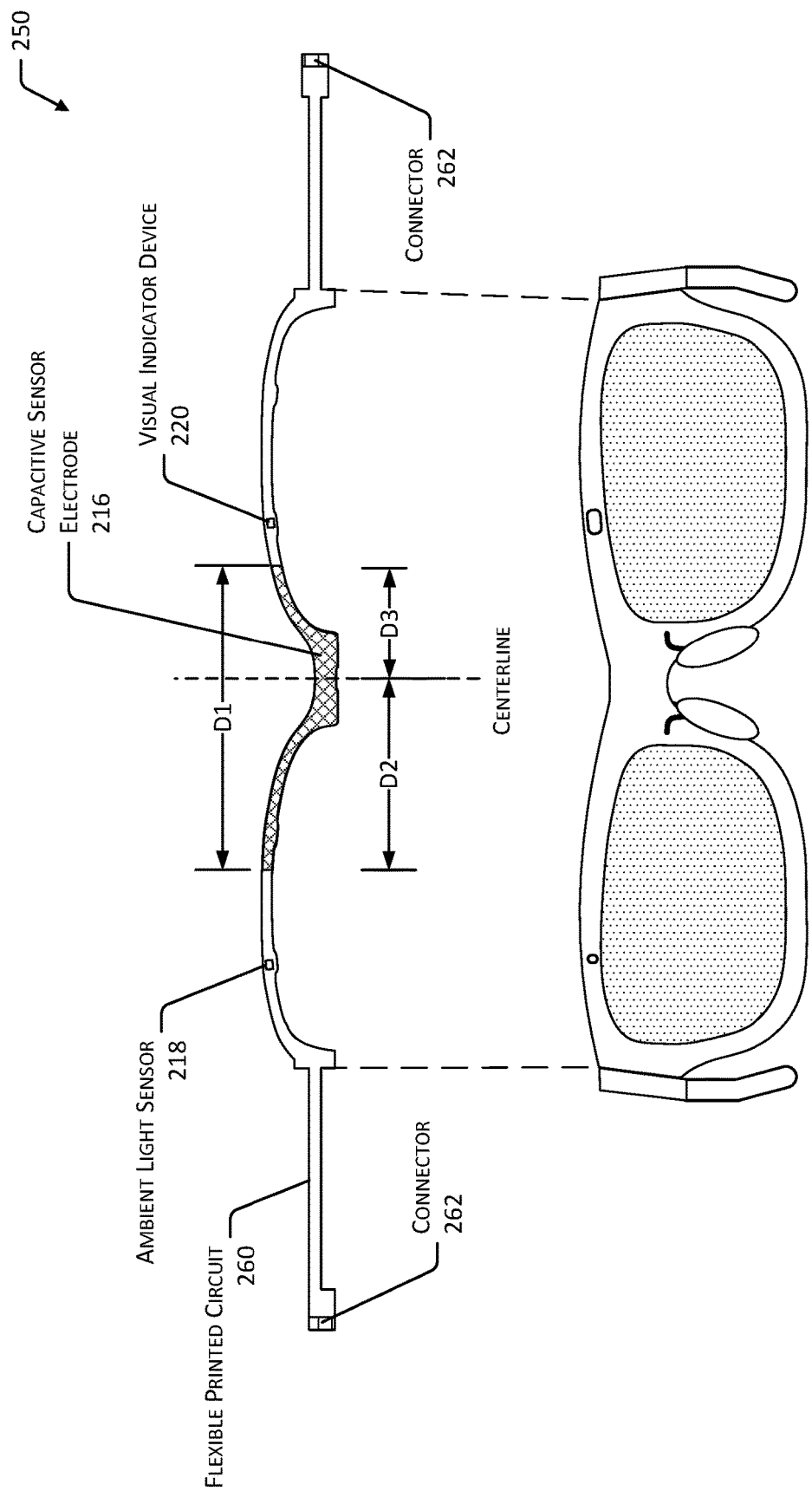

FIG. 2B depicts at 250 a portion the HMWD 106, according to some implementations. A flexible printed circuit (FPC) 260 is depicted that may be placed within the HMWD 106 during assembly. The FPC 260 provides various functions, including connectivity between electronics in the left and right temples 222 as well as connectivity to and mounting for the ambient light sensor 218, visual indicator device 220, and a capacitive sensor electrode 216.

In the implementation depicted at 250, the capacitive sensor electrode 216 is arranged proximate to the frame bridge 210 and extends from a centerline of the front frame 202. The capacitive sensor electrode 216 may comprise a copper or other electrically conductive material arranged on the FPC 260. The arrangement of the capacitive sensor electrode 216 with respect to the FPC 260 and the front frame 202 in this implementation is asymmetrical with respect to the centerline. The capacitive sensor electrode 216 extends a first distance D1 from a left edge to a right edge. A second distance D2 from the left edge to the centerline is shown, as is a third distance D3 from the centerline to the right edge. The distance D2 is greater than D3 in this implementation. In other implementations, the arrangement may vary. For example, the distance D3 may be greater than D2, the distance D2 and D3 may be equal, and so forth.

The arrangement of the capacitive sensor electrode 216 may be based at least in part on accommodation of other devices on the FPC 260. For example, the distance D2 may be limited by the placement of the ambient light sensor 218, while the distance D3 may be limited by the placement of the visual indicator device 220.

FIG. 3 depicts an exterior view 300, from below, of the HMWD 106 in an unfolded configuration, according to some implementations. In this view, the front frame 202 is visible along with the inner cover 204.

The HMWD 106 may include capacitive sensor electrodes 216 at one or more locations. As shown here, the first capacitive sensor electrode 216(1) is proximate to the frame bridge 210. The third capacitive sensor electrode 216(3) and the fifth capacitive sensor electrode 216(5) are also shown. One or more temples 222 may include a capacitive sensor electrode 216 to determine if an object, such as the head 104, is nearby. For example, the left temple 222(L) may comprise a sixth capacitive sensor electrode 216(6) that is proximate to an interior side of the temple 222, or a housing thereof. The sixth capacitive sensor electrode 216(6) may be proximate to an internal surface of a housing that is on an interior side of the temple 222. Likewise, the right temple 222(R) may comprise a seventh capacitive sensor electrode 216(7). In other implementations the capacitive sensor electrode(s) 216 may be placed in other locations. For example, the sixth capacitive sensor electrode 216(6) may be positioned to be proximate to the user's 102 ear, such as proximate to the BCS 306(1). Data from one or more of these capacitive sensor electrodes 216 may be used to determine the don/doff data 134.

One or more hinges 302 may be affixed to, or an integral part of, the front frame 202. Depicted are a left hinge 302(L) and a right hinge 302(R) on the left and right sides of the front frame 202, respectively. The left hinge 302(L) is arranged at the left brow section 206(L), distal to the frame bridge 210. The right hinge 302(R) is arranged at the right brow section 206(R) distal to the frame bridge 210.

The temple 222 may couple to a portion of the hinge 302. For example, the temple 222 may comprise one or more components, such as a knuckle, that mechanically engage one or more corresponding structures on the hinge 302.

The left temple 222(L) is attached to the left hinge 302(L) of the front frame 202. The right temple 222(R) is attached to the right hinge 302(R) of the front frame 202.

The hinge 302 permits rotation of the temple 222 with respect to the hinge 302 about an axis of rotation. The hinge 302 may be configured to provide a desired angle of rotation. For example, the hinge 302 may allow for a rotation of between 0 and 120 degrees. As a result of this rotation, the HMWD 106 may be placed into a folded configuration. For example, each of the hinges 302 may rotate by about 90 degrees inward with the temples 222 moving toward the front frame 202.

The HMWD 106 may include one or more air conduction speakers (ACSs) 304. For example, a first ACS 304(1) is located in the left temple 222(L) and a second ACS 304(2) is located in the right temple 222(R). The ACS 304 is designed to produce vibrations in the surrounding air. For example, the ACS 304 may comprise a diaphragm that is moved to generate sound waves in the air. The ACS 304 may use one or more mechanisms to generate sound waves. These mechanisms may include, but are not limited to: voice coils, piezoelectric elements, metallic ribbon elements, magnetostrictive elements, electrostatic elements, and so forth.

The ACS 304 may operate to produce sound between 500 Hertz (Hz) and 20 kHz. For example, the ACS 304 may comprise the Cobra electrodynamic transducer model number 2403-260-0091 from Knowles Electronics, LLC. of Itasca, Il., United States of America.

The ACS 304 may have a speaker opening that allows sound to be transferred from the ACS 304 to the surrounding environment. The speaker opening may comprise one or more holes that provide a passageway or hole through an exterior housing to the exterior environment. In some implementations the speaker opening may be covered or filled with a grill, mesh, fabric, elastomeric material, and so forth.

One or more bone conduction speakers (BCS) 306 may be emplaced on the temples 222. For example, as depicted here, a BCS 306 may be located on the surface of the temple 222 that is proximate to the head 104 of the user 102 during use.

A movable element of the BCS 306 may be in mechanical contact with the head 104 of the user 102 and produces BCS 306 audio output that is physical displacement or vibrations in the head 104 of the user 102. These vibrations are then perceived as sound by the ear of the user 102. In one implementation, the BCS 306 may comprise a piezoelectric material that, upon application of a voltage, physically changes shape. In another implementation, the BCS 306 may comprise an electromagnet that, upon application of a voltage, moves a core.

The BCS 306 may be mounted in the same temple 222 as the ACS 304. For example, as shown here the left temple 222(L) includes the BCS 306(1) and the ACS 304(1). In some implementations, the BCS 306 may be used to provide the functionality of a bone conduction microphone (BCM) 310. For example, the BCS 306 may be used to detect vibrations of the head 104.

A head contact piece 308 may be affixed to, or part of, the BCS 306 in some implementations. Performance of the BCS 306 improves when there is sufficient mechanical coupling with a portion of the head 104 of the user 102. However, different users 102 may exhibit different head 104 shapes. To improve mechanical coupling between the BCS 306 and different head shapes, a head contact piece 308 may be affixed to the BCS 306. In one implementation, the head contact piece 308 may be wedge shaped, having a thicker end and tapering to a thinner end. The thickest part of the wedge may be positioned towards the front of the BCS 306, closest to the front of the HMWD 106. In other implementations, the head contact piece 308 may exhibit other shapes. For example, the head contact piece 308 may be concave.

The head contact piece 308 may be removeable or adjustable to accommodate different shapes of heads 104. For example, magnets may be used to join the head contact piece 308 to the BCS 306. In another example, one or more of the BCS 306 or the head contact piece 308 may include a magnetically receptive material that is attracted to magnets on the opposing structure.

The head contact piece 308 may comprise an elastomeric material that conforms at least partially to the contour of the head 104. For example, the head contact piece 308 may comprise one or more thermoplastic elastomers exhibiting a Shore hardness of 40A. In other implementations, the head contact piece 308 may comprise a rigid material, or a combination of soft and hard materials. For example, a rigid inner component may be coated with an elastomer.

The HMWD 106 may include one or more bone conduction microphones (BCMs) 310. The BCM 310 is responsive to the vibrations produced by the user 102, such as while speaking. For example, the BCM 310 may comprise an accelerometer, gyroscope, vibration sensor, and so forth that detect the vibrations in the head 104 of the user 102 that result from utterances of the user 102. The BCM 310 may be arranged to be in contact with the skin above a bony or cartilaginous structure. For example, where the HMWD 106 is in the form of eyeglasses, nose pads 214 of a nosepiece 212 may be mechanically coupled to the BCM 310 such that vibrations of the nasal bone, glabella, or other structures upon which the nose pads 214 may rest are transmitted to the BCM 310. In other implementations, the BCM 310 may be located elsewhere with respect to the HMWD 106, or worn elsewhere by the user 102. For example, the BCM 310 may be incorporated into the temple 222 of the HMWD 106, a hat, or a headband.

One or more different sensors 114 may be placed on the HMWD 106. In one implementation, the touch sensor 120 may be arranged along an exterior surface of the right temple 222(R). One or more air conduction microphones (ACM) 312 may also be provided. For example, a first ACM 312 may be located at the frame bridge 210, while a second ACM 312 is located in the left temple 222(L), a third ACM 312 is located in the right temple 222(R), and so forth. In another example, a fourth ACM 312 may be located within or proximate to the left hinge 302(L), such as on the underside of the left hinge 302(L).

The ACM 312 may comprise a diaphragm or other elements that move in response to the displacement of air by sound waves. The ACMs 312 may have corresponding ports that provides a passageway between the exterior environment and the ACM 312.

The ACM 312 may comprise a diaphragm, MEMS element, or other elements that move in response to the displacement of air by sound waves. Data produced by the ACM 312 may be generated that is indicative of the sound detected by the ACM 312. For example, audio input data may be generated based on input from one or more ACMs 312.

One or more buttons may be placed in other locations on the HMWD 106. For example, a button may be emplaced within, or proximate to, the right hinge 302(R), such as on an underside of the right hinge 302(R).

One or more components of the HMWD 106 may comprise single unitary pieces or may comprise several discrete pieces. For example, the front frame 202 and the nosepiece 212 may comprise a single piece, or may be constructed from several pieces joined or otherwise assembled.

Figure 4:
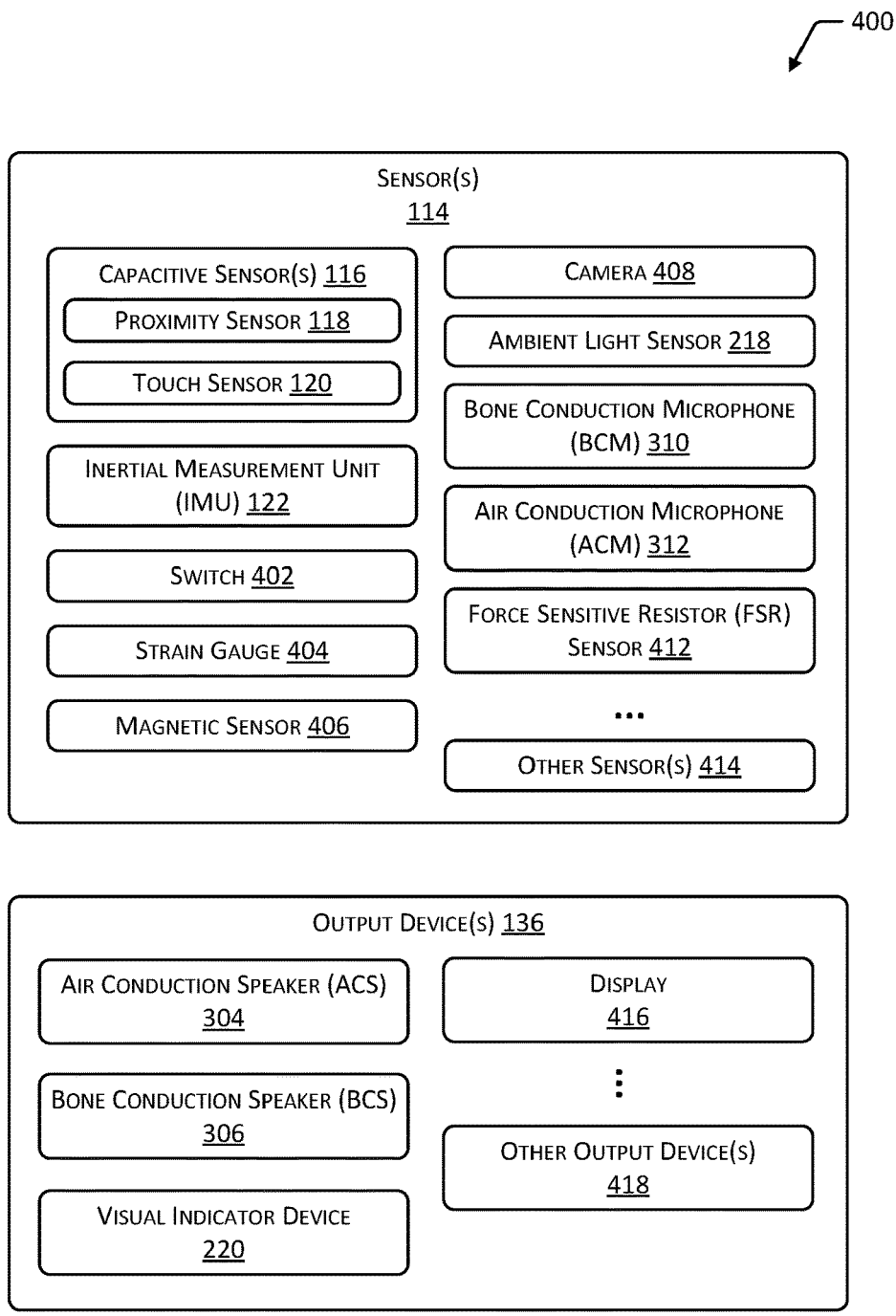
FIG. 4 provides an illustration of several sensors and output devices that may be used by the head-mounted wearable device, according to some implementations.

FIG. 4 provides an illustration 400 of several sensors 114 and output devices 136 that may be used by the HMWD 106, according to some implementations. The sensors 114 may include one or more the following.

As described above, the sensors 114 may include capacitive sensor devices 116. For example, the capacitive sensor devices 116 may comprise capacitive sensor circuitry that is connected to one or more capacitive sensor electrodes 216. The capacitive sensor devices 116 may include, but are not limited to, proximity sensors 118, touch sensors 120, and so forth. For example, a proximity sensor 118 may provide as output a one dimensional set of capacitance values while a touch sensor 120 may provide output indicative of touch points as expressed along two dimensions.

As also described above, the sensors 114 may include one or more IMUs 122. For example, an IMU 122 may be located within one or more of the front frame 202, the left temple 222(L), the right temple 222(R).

A switch 402 may comprise a mechanical or electronic switch or other mechanism that is responsive to an external force. For example, the switch 402 may comprise a spring-biased switch that, when depressed, establishes an electric connection.

A strain gauge 404 provides information indicative of an amount of mechanical deflection. For example, the strain gauge 404 may be configured to determine an amount of flexure in a temple 222 of the HMWD 106. The strain gauge 404 may generate strain data. For example, the strain data may comprise an eight bit value indicative of a direction and magnitude of displacement of a substrate to which the strain gauge 404 is affixed. The strain data may include a timestamp indicative of when the strain was measured, acquired, and so forth.

A magnetic sensor 406, such as a magnetometer, magnetic reed switch, and so forth provides information about magnetic fields. For example, a magnetometer may utilize a plurality of Hall effect sensors to detect the presence of the terrestrial magnetic field, magnetic field from a magnetic, and so forth. Output from the magnetic sensor 406 may be used determine a change heading with respect to the Earth's magnetic field. In some implementations, the IMU 122 may include the magnetic sensor 406.

A camera 408 may be used to acquire image data. The camera 408 may be configured to detect light in one or more wavelengths including, but not limited to, terahertz, infrared, visible, ultraviolet, and so forth. The camera 408 may comprise one or more charge coupled devices (CCD), complementary metal oxide semiconductor (CMOS) devices, microbolometers, and so forth.

An ambient light sensor 218 may include one or more of a photodetector, semiconductor junction, or other device that is sensitive to the presence or absence of light. The ambient light sensor 218 may provide information indicative of the level of illumination present at the HMWD 106.

As described above, the HMWD 106 may include one or more BCMs 310. The HMWD 106 may include one or more ACMs 312.

A force sensitive resistor (or force sensing resistor) (FSR) sensor 412 comprises a layer of a material that changes in electrical resistance or conductivity responsive to an applied mechanical force. For example, an increase in force may result in a decrease in the electrical resistance measured across the material. In one implementation, the FSR sensor 412 may comprise a conductive polymer within which electrically conductive and nonconductive particles are suspended. The material to change electrical resistance may be arranged between the first electrode and the second electrode. Electrical circuitry may be used to determine electrical resistance between the first electrode and the second electrode. During operation, the FSR sensor 412 produces FSR data. The FSR data may include one or more force measurement values (FMVs) that are indicative of a magnitude of a mechanical force that is applied to the FSR sensor 412. In some implementations, the FSR data may include one or more timestamps. For example, each FMV may have an associated timestamp indicative of when that value was measured, acquired, and so forth. The FSR data may also include information indicative of the particular FSR sensor 412 that generated the FMV.

Other sensors 414 may also be present. For example, physiological data may be obtained by a biomedical sensor. The biomedical sensor may include one or more of a photoplethysmograph, pulse sensor, oximeter, electrocardiograph, encephalograph, myograph, respirometer, and so forth.

As described above, the HMWD 106 may include one or more output devices 136, which may include one or more of an ACS 304, BCS 306, VID 220, and so forth.

In some implementations the HMWD 106 may include a display 416. The display 416 is configured to present an image to the user 102. For example, the display 416 may comprise a liquid crystal display or light emitting diode display that manipulates rows and columns of picture elements to form an image. The display 416 may be emissive, reflective, or both. The display 416 may include image projectors. For example, the image projector may be configured to project an image onto a surface or object, such as a lens or the eye of the user 102. The image may be generated using MEMS, LCOS, lasers, and so forth.

Other output devices 418 may also be used by the HMWD 106. For example, the HMWD 106 may include a dispenser to release particular scents near the nose of the user 102.

Figure 5:
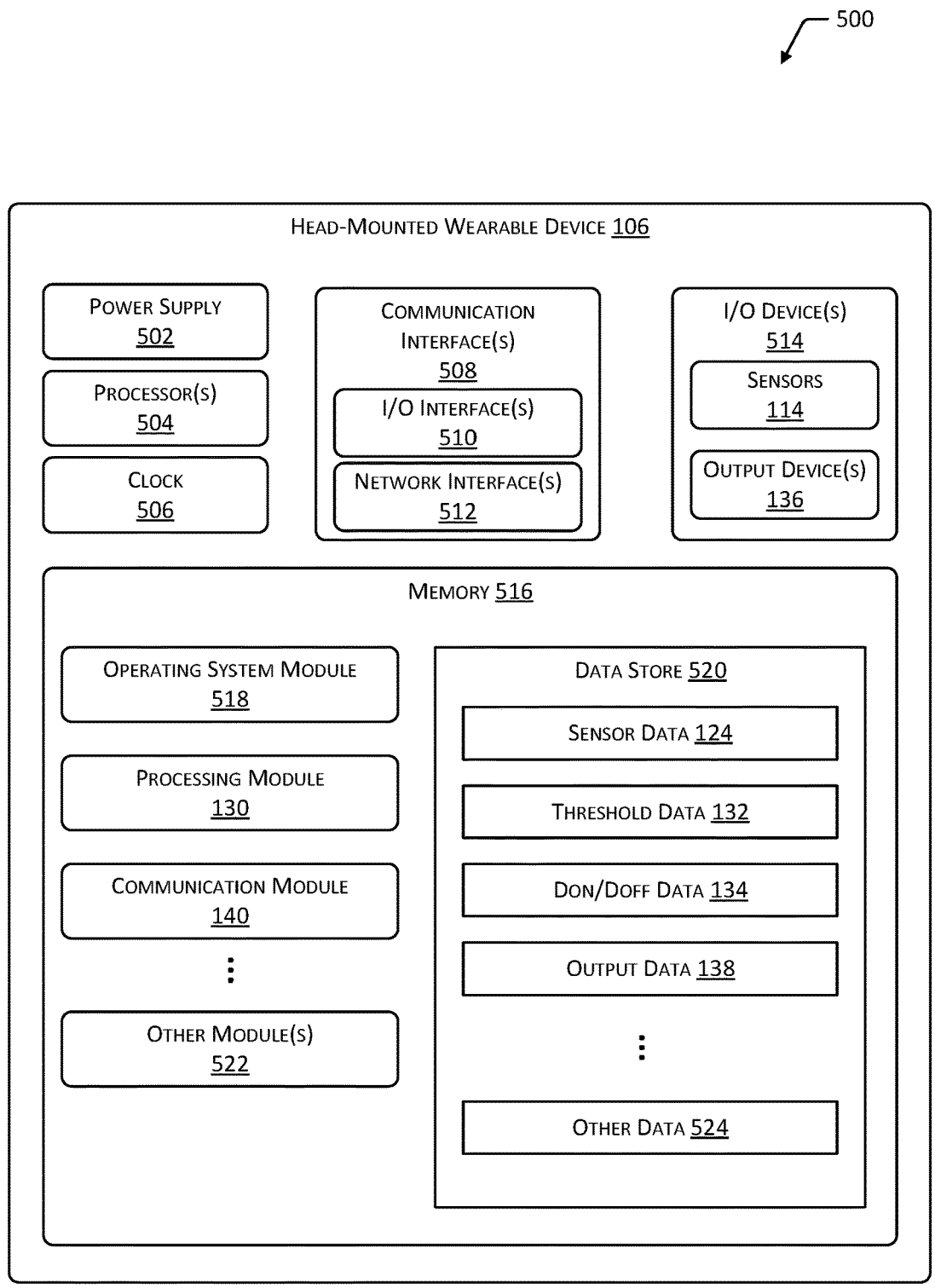
FIG. 5 is a block diagram of electronic components of the head-mounted wearable device, according to some implementations.

FIG. 5 is a block diagram 500 of components of the head-mounted wearable device 106, according to some implementations.

One or more power supplies 502 may be configured to provide electrical power suitable for operating the components in the HMWD 106. The one or more power supplies 502 may comprise batteries, capacitors, fuel cells, photovoltaic cells, wireless power receivers, conductive couplings suitable for attachment to an external power source such as provided by an electric utility, and so forth. For example, the batteries of the HMWD 106 may be charged wirelessly, such as through inductive or capacitive power transfer. In another implementation, electrical contacts may be used to recharge the HMWD 106.

The HMWD 106 may include one or more hardware processors 504 (processors) configured to execute one or more stored instructions. The processors 504 may comprise one or more cores. The processors 504 may include general purpose microprocessors, microcontrollers, application specific integrated circuits (ASICs), digital signal processors (DSPs), and so forth. One or more clocks 506 may provide information indicative of date, time, ticks, and so forth. For example, the processor 504 may use data from the clock 506 to associate a particular interaction with a particular point in time.

The HMWD 106 may include one or more communication interfaces 508 such as input/output (I/O) interfaces 510, network interfaces 512, and so forth. The communication interfaces 508 enable the HMWD 106, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include the sensors 114 and the output devices 136. In some embodiments, the I/O devices 514 may be physically incorporated with the HMWD 106 or may be externally placed. The output devices 136 are configured to generate signals, which may be perceived by the user 102 or may be detected by sensors 114.

The network interfaces 512 may be configured to provide communications between the HMWD 106 and other devices, such as the server 144. The network interfaces 512 may include devices configured to couple to personal area networks (PANs), wired or wireless local area networks (LANs), wide area networks (WANs), and so forth. For example, the network interfaces 512 may include devices compatible with Ethernet, Wi-Fi, Bluetooth, Bluetooth Low Energy, ZigBee, 5G, LTE, and so forth.

The HMWD 106 may also include one or more busses or other internal communications hardware or software that allow for the transfer of data between the various modules and components of the HMWD 106.

As shown in FIG. 5, the HMWD 106 includes one or more memories 516. The memory 516 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 516 provides storage of computer-readable instructions, data structures, program modules, and other data for the operation of the HMWD 106. A few examples of functional modules are shown stored in the memory 516, although the same functionality may alternatively be implemented in hardware, firmware, or as a system on a chip (SoC).

The memory 516 may include at least one operating system (OS) module 518. The OS module 518 is configured to manage hardware resource devices such as the I/O interfaces 510, the I/O devices 514, the communication interfaces 508, and provide various services to applications or modules executing on the processors 504. The OS module 518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 516 may be a data store 520 and one or more of the following modules. These modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including servers 144, network attached storage devices, and so forth.

The processing module 130 may utilize the sensor data 124 from one or more the sensors 114 and threshold data 132 to determine don/doff data 134. The capacitance data 126 may comprise one or more capacitance values. For example, the proximity sensor 118 may comprise the first capacitive sensor electrode 216(1) connected to capacitive sensor circuitry, such as the PSOC. The capacitive sensor circuitry may then provide a series of capacitance values, each indicative of a capacitance or change in capacitance of the first capacitive sensor electrode 216.

Output from the proximity sensor 118 may be affected by environmental conditions, such as temperature, humidity, and so forth. For example, changes in temperature due to the heat of the body of the user 102 may cause a change in the capacitance of the capacitive sensor electrode 216. As described next, the device may compensate for these effects.

In some implementations, the capacitive sensor circuitry may utilize a sigma-delta modulator (SDM) to measure the capacitance between the capacitive sensor electrode 216 and a ground. During operation, some input signals may not be properly encoded by the SDM, producing "dead zones". A "dead zone" is a range of inputs for which the SDM produces the same average output value. Thermal drift of the combination of the portion of the system comprising the capacitive sensor circuitry and the capacitive sensor electrode 216 may exceed a completely linear range of the SDM. However, trying to sense within the "dead zones" results in no change in output. As a result, the thermal drift may impair operation of the system.

The capacitive sensor electronics, such as the PSOC, may include a current digital to analog converter (IDAC). During operation, the IDAC adjusts to maintain input signals that are within a linear range of the analog to digital converter (ADC). The system may perform oversampling, such as using a resolution of 11 bits, and acquire 8 samples at different sensitivity levels. For example, each sensitivity level may be associated with a different driving voltage, driving current, and so forth. While a given set of samples may include a dead zone, the combination of the samples with the different sensitivity levels produces a set of processed values that are "contiguous", in that they do not exhibit any effects from a "dead zone". As a result, an increase in capacitance will always result in an increase in the output, such as an increase in raw counts from the circuitry.

The processed values may then be filtered to remove higher frequency noise and improve the signal to noise ratio (SNR). In one implementation, a finite impulse response (FIR) median filter may be used. In another implementation an infinite impulse response (IIR) first order low pass filter may be used to filter the processed values to produce the filtered capacitance values. The filtered capacitance values may then be used for subsequent analysis to determine the don/doff data 134.

Several different techniques may be used to determine the don/doff data 134. These techniques may be used independently or may be combined. For example, a first technique may be used solely to determine the don/doff data 134 in one implementation while first, second, and third techniques are used in conjunction with one another to determine the don/doff data 134. The following techniques may use "raw", processed, filtered, or other data from the capacitive sensor circuitry.

A first technique may use a comparison of capacitance values in the capacitance data 126 and acceleration values in the motion data 128 with threshold values to determine the don/doff data 134. For example, a don 110 may be determined based at least in part on proximity sensor data indicating that the processed values from the proximity sensor 118 exceeded a baseline value for a first interval of time or number of counts to "debounce" the output. The baseline value may be representative of a response to the ambient conditions, such as temperature. In one implementation, the IIR first order low pass filter may be used to determine the baseline values. The change in capacitance may be used in combination with the determination that the motion data 128 is indicative of an acceleration that exceeds a threshold value for a second interval of time to determine that a don 110 has taken place. Other techniques for determining don/doff data 134 are discussed in more detail with regard to FIGS. 6 and 7.

In some implementations, the capacitance data 126 may be processed using one or more machine learning techniques or algorithms to determine the don/doff data 134. For example, the capacitance data 126 may be processed using a classifier to determine the capacitance data 126 is either indicative of a donned 110 state or the doffed 112 state. The classifier may be trained using the capacitance data 126 and input from other sensors 114 such as the IMU 122, user input, and so forth. For example, the classifier may be trained for a particular user 102 by using input from another sensor 114 or set of sensors such as the IMU 122 and user input. Continuing the example, the user 102 may press the button, swipe the touch sensor 120, or provide other input that is indicative of whether the HMWD 106 is donned 110 or doffed 112. The classifier may then be trained using this input and the capacitance data 126 to subsequently provide automated results. Instead of or in addition to the use of the classifier, other techniques such as artificial neural networks (ANNs), support vector machine, Bayesian networks, Markov networks, and so forth may be used.

In another implementation a finite state machine (FSM) may be used to determine the don or doffed states. For example, a finite state machine may use one or more of the capacitance data 126, the motion data 128, or other sensor data 124 to determine the don/doff data 134. In some implementations a plurality of FSMs may be used. For example, a first FSM may determine if the orientation of the HMWD 106 is consistent with being donned or doffed. A second FSM may determine if accelerations of the HMWD 106 are consistent with being donned or doffed. A third FSM may determine if the capacitance data 126 is indicative of being donned or doffed. A fourth FSM may use the outputs from the first, second, and third FSMs to determine the don/doff data 134.

One or more functions of the processing module 130 may be executed at least in party by the capacitive sensor circuitry, such as the PSOC. For example, the processing and filtering may be performed by the PSOC, while the assessment of the capacitance data 126, the motion data 128, or other sensor data 124 to determine the don/doff data 134 is performed by the one or more processors 504.

One or more modules or components of the HMWD 106 may change operation based at least in part on the don/doff data 134. For example, a power management integrated circuit (PMIC) may, responsive to the don/doff data 134, transition one or more components of the HMWD 106 from a first mode to a second mode. Continuing the example, the first mode consumes a first amount of electrical power and the second mode consumes a second amount of electrical power that is different from the first amount. For example, the first mode may comprise an operational or "awake" mode with components operating at their normal voltages, frequencies, and so forth, while the second mode comprises a low power or "sleep" mode in which the components are inoperative or operating at reduced voltages, frequencies, and so forth.

The memory 516 may store the communication module 140. The communications may be authenticated, encrypted, and so forth.

During operation, the HMWD 106 may store sensor data 124 or other data at least temporarily, in the data store 520. Other modules 522 may also be present in the memory 516 as well as other data 524 in the data store 520.

Figure 6:
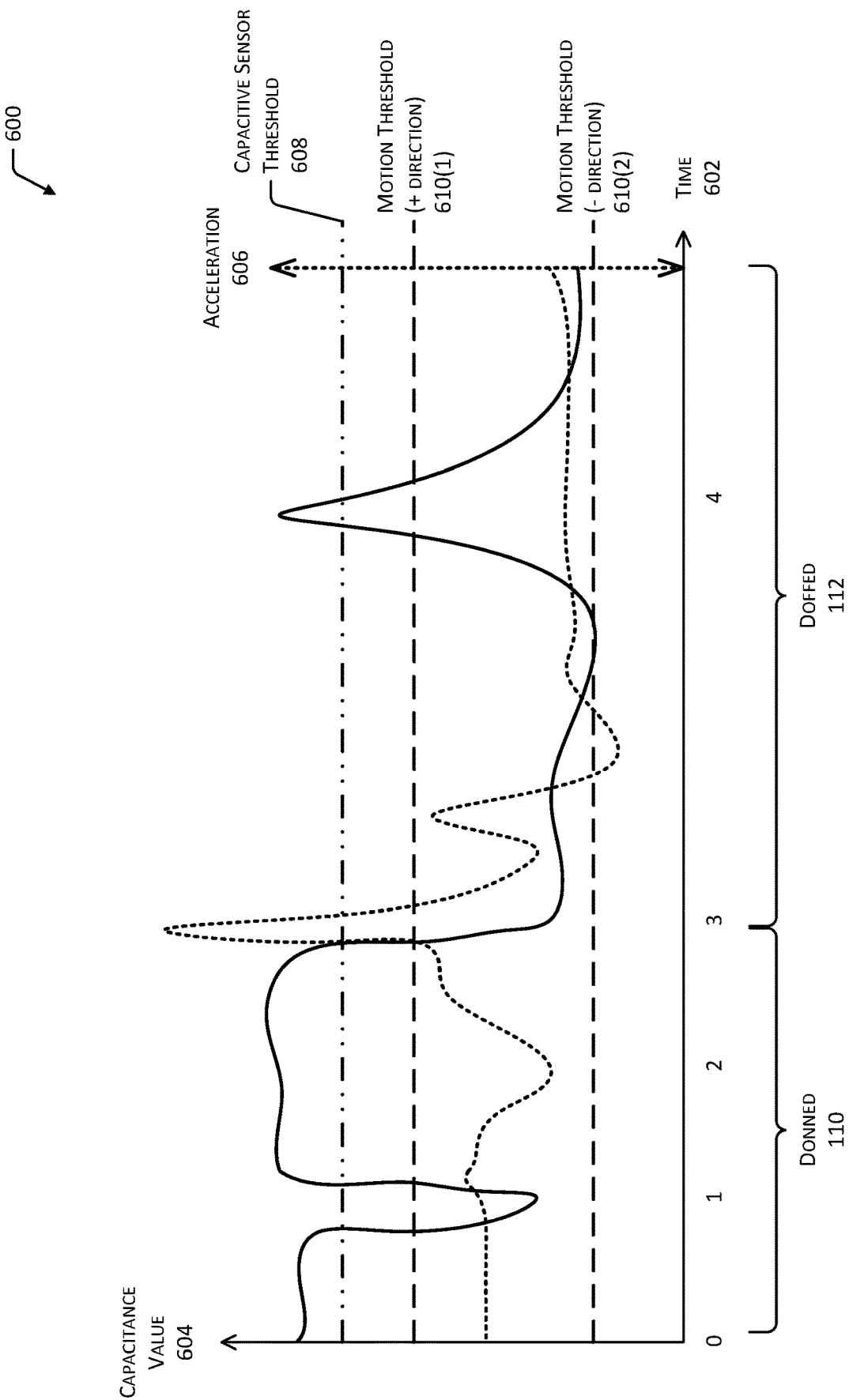
FIG. 6 depicts a graph of capacitive values and acceleration over time as used to determine don and doff, according to some implementations.

FIG. 6 depicts a graph 600 of capacitive values and acceleration over time as used to determine don and doff, according to some implementations. A horizontal axis indicates time 602, while two vertical axes are shown. A first vertical axis on the left of the graph depicts capacitance values 604, such as counts from the capacitive sensor circuitry. A first curve showing these counts is changing over time is depicted with a solid line. A second vertical axis on the right of the graph depicts acceleration 606. In some implementations, the acceleration 606 may be positive or negative with respect to the axis being measured. A second curve showing the acceleration changing over time is depicted with a dotted line.

A first dashed horizontal line indicates a capacitive sensor threshold 608. Two other dashed horizontal lines indicate a first motion threshold 610(1) along a first direction and a second motion threshold 610(2) along a second direction opposite the first direction. For ease of illustration, and not necessarily as a limitation, motion along a single axis is shown here. In other implementations, other motions, such as rotation or linear motion with respect to two or more axes may be considered.

At time t=0 the capacitance value 604 is greater than the capacitive sensor threshold 608. At approximately time t=1 the capacitance value 604 decreases below the capacitive sensor threshold 608. Meanwhile at this time the acceleration 606 at approximate time t=1 has remained between the first motion threshold 610(1) and the second motion threshold 610(2). The processing module 130 may determine based on this discrepancy that the HMWD 106 is donned 110.

At approximately time t=3 the capacitance value 604 drops below the capacitive sensor threshold 608 while the acceleration 606 is greater than the first motion threshold 610(1). As a result, the processing module 130 may determine that the HMWD 106 has been doffed 112. As time processes, the acceleration 606 briefly exceeds the second motion threshold 610(2), but the capacitance value 604 remains below the capacitive sensor threshold 608 until a peak at approximately time t=4 which then returns to below the capacitive sensor threshold 608. Because the acceleration 606 did not exhibit a similar excursion outside of the motion thresholds 610 at the time corresponding to the peak, the processing module 130 determines that the HMWD 106 is doffed 112.

Figure 7:
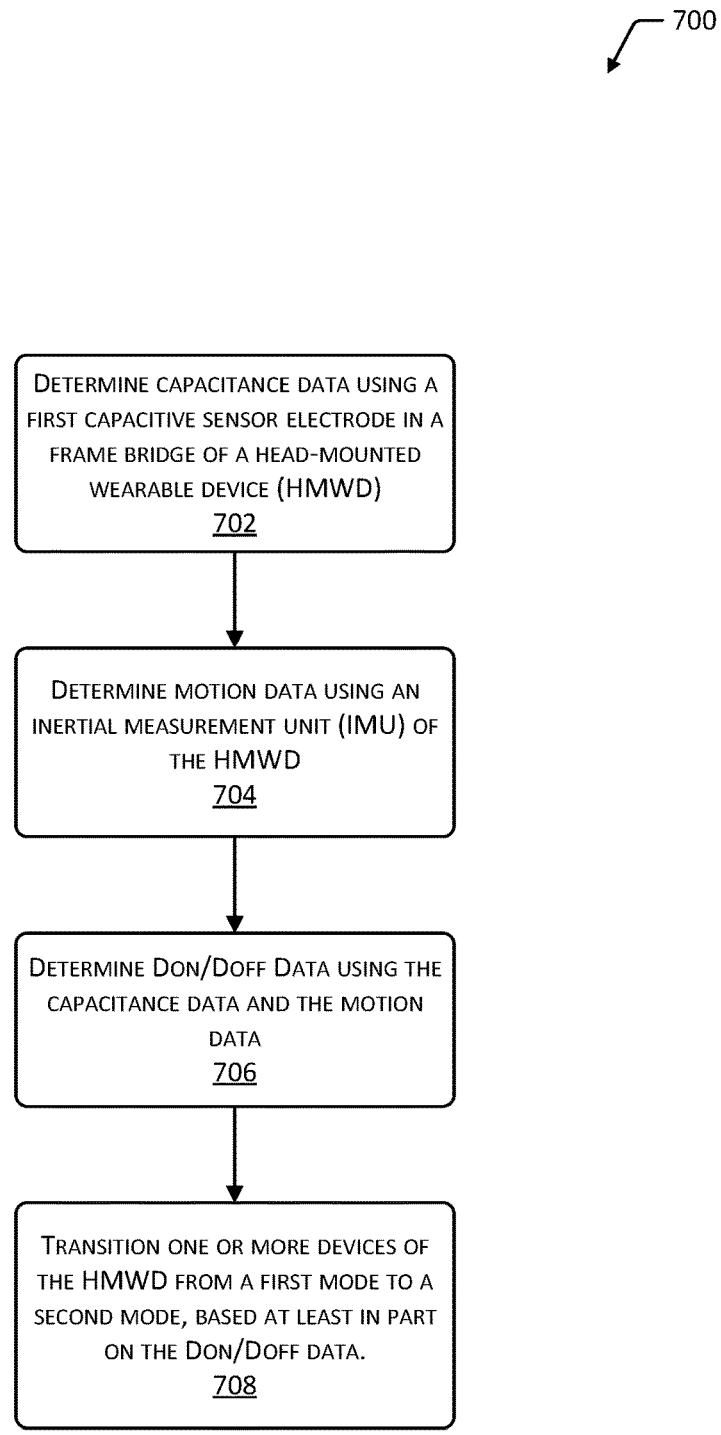
FIG. 7 depicts a flow diagram of a process for determining don/doff data using a capacitive sensor device, according to some implementations.

FIG. 7 depicts a flow diagram 700 of a process for determining don/doff data 134 using a proximity sensor 118 and sensor data 124 from one or more other sensors 114, such as an IMU 122, according to some implementations. The process may be implemented at least in part by one or more of the PSOC, the processor 504, and so forth.

At 702 capacitance data 126 is determined using a first capacitive sensor electrode 216(1) in a frame bridge 210 of a HMWD 106. For example, the capacitance data 126 may be acquired from a first time to a second time by the capacitive sensor circuitry using the first capacitive sensor electrode 216(1).

At 704 motion data 128 of at least a portion of the HMWD 106 is determined using an IMU 122 of the HMWD 106. For example, the motion data 128 may be acquired from the first time to the second time by the IMU 122.

At 706 don/doff data 134 is determined using the capacitance data 126 and the motion data 128. One or more techniques may be used to determine the don/doff data 134. The following techniques may use "raw", processed, filtered, or other data from the capacitive sensor circuitry. In some implementations additional data processing may be performed. For example, the values used for the determinations may comprise an average of values for a preceding interval of time or timeslot. Comparisons of values with respect to thresholds may be performed for given intervals to "debounce" a signal and prevent incorrect determinations due to noise. For example, an average value for a particular interval of time may be assessed, rather than a single value of capacitance, acceleration, and so forth.

A first technique to determine the don/doff data 134 uses a decrease in capacitance values and a change in acceleration to determine the HMWD 106 has been doffed 112. In this technique, a first capacitance value 604 based on the capacitance data 126 associated with the first time is determined. The first capacitance value 604 is determined to be less than a first threshold value. For example, the first capacitance value 604 is determined to be less than the capacitive sensor threshold 608. A first motion value based on the motion data 128 associated with the first time is also determined. The first motion value is greater than a second threshold value. For example, the acceleration 606 along a particular axis may exceed the motion threshold 610. In some implementations the motion values may comprise an aggregate value of accelerations or rotations with respect to more than one axis. For example, the motion value may comprise a sum of the absolute value of accelerations. Responsive to these determinations, the don/doff data 134 is determined that indicates the HMWD 106 has been doffed 112.

A second technique to determine the don/doff data 134 uses an increase in capacitance values and the motion values to determine that the HMWD 106 is donned 110. A first capacitance value 604 may be determined based on the capacitance data 126 associated with a first time. The first capacitance value 604 is determined to be greater than a first threshold value. A first motion value is determined, based on the motion data 128 associated with a second time that is after the first time. For example, a peak in acceleration is determined to have happened after a drop in the capacitance values 604. The first motion value is determined to be less than a second threshold value. Responsive to these determinations, the don/doff data 134 is determined that is indicative of the HMWD 106 being donned 110.

A third technique determines a sustained don 110, providing don/doff data 134 that indicates the HMWD 106 continues to be in a donned 110 state. A capacitance value 604 based on the capacitance data 126 is determined to be less than a first threshold value. A motion value based on the motion data 128 is determined. The motion value may be indicative of an acceleration with respect to a first axis of the IMU 122. The motion value is determined to be less than a second threshold value. Responsive to these determinations, the don/doff data 134 is indicative of the HMWD 106 being donned 110.

A fourth technique determines the HMWD 106 has been doffed 112 based on the capacitance data 126 and motion data 128 that is indicative of an orientation (with respect to vertical) that is incompatible with typical use. For example, the HMWD 106 is determined as being doffed 112 if the capacitive values 604 are less than a threshold and the HMWD 106 is upside down for longer than a specified interval of time. A first range of angles with respect to vertical may be specified that are associated with being donned 110, while a second range of angles with respect to vertical may be specified that are associated with being doffed 112. If the capacitance values 604 are below the capacitive sensor threshold 608 and the orientation of the HMWD 106 is such that it is outside of the first range, then the HMWD 106 may be deemed to be doffed 112.

A fifth technique may use a machine learning system to determine a signature or profile that is associated with a don 110 or doff 112. For example, the capacitance data 126 may be processed using a classifier to determine the capacitance data 126 is either indicative of a donned 110 state or the doffed 112 state. The classifier may be trained using the capacitance data 126 and input from other sensors such as the IMU 122, user input, and so forth. Instead of or in addition to the use of the classifier, other techniques such as artificial neural networks (ANNs), support vector machine, Bayesian networks, Markov networks, and so forth may be used.

The techniques may utilize capacitance data 126 obtained using different capacitive sensor electrodes 216 may be used. For example, the capacitive sensor circuitry may determine capacitive data 126 using the first capacitive sensor electrode 216(1), the third capacitive sensor electrode 216(3), the sixth capacitive sensor electrode 216(6) in a temple 222, and so forth.

At 708 one or more devices of the HMWD 106 are transitioned from a first mode to a second mode. For example, responsive to the capacitance values exceeding the capacitive sensor threshold 608, the IMU 122 may be transitioned from a first mode to a second mode in which the first mode consumes less electrical power than the second mode.

While the examples described in this disclosure discuss the use and processing of digital signals, it is understood that in other implementations the signals may be processed in the analog domain, or in a hybrid analog and digital domain.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device (HMWD) comprising:
   a front frame having a frame bridge;
   a first hinge at a first side of the front frame;
   a second hinge at a second side of the front frame;
   a first temple connected to the first hinge;
   a second temple connected to the second hinge;
   a first electrode arranged within the front frame proximate to the frame bridge
   capacitive sensor circuitry, connected to the first electrode, to determine capacitance data;
   an inertial measurement unit (IMU) to determine motion data; and
   a processor to execute instructions to:
      determine a first capacitance value based on the capacitance data associated with a first time;
      determine the first capacitance value is greater than a first threshold value;
      determine a first motion value based on the motion data, wherein the first motion value is associated with the first time;
      determine the first motion value is greater than a second threshold value;
      determine a second motion value based on the motion data, wherein the second motion value is associated with a second time that is after the first time;
      determine the second motion value is less than a third threshold value; and
      determine first don/doff data that is indicative of the HMWD being donned based at least on the first capacitance value, the first motion value, the second motion value, the determination that first capacitance value is greater than the first threshold value, the determination that the second motion value is greater than the second threshold value, and the determination that the second motion value is less than the third threshold value.

2. The HMWD of claim 1, the processor to further execute instructions to:
   determine a second capacitance value based on the capacitance data, wherein the second capacitance value is associated with a third time that is after the second time;
   determine the second capacitance value is less than the first threshold value;
   determine a third motion value based on the motion data, wherein the third motion value is associated with the third time;
   determine the third motion value is greater than the second threshold value; and
   determine second don/doff data that is indicative of the HMWD being doffed based at least on the second capacitance value, the third motion value, the determination that second capacitance value is less than the first threshold value, and the determination that the third motion value is greater than the second threshold value.

3. A head-mounted wearable device (HMWD) comprising:
   a front frame having a frame bridge;
   a capacitive sensor device comprising:
      at least one electrode supported by the front frame and proximate to the frame bridge, and
      capacitive sensor circuitry, connected to the at least one electrode, to determine first data;
   an inertial measurement unit (IMU) to determine second data; and
   a processor to execute instructions to:
      determine, based on the second data, a first orientation of the HMWD;
      determine a relationship between the first orientation and a first range of angles associated with the HMWD being donned;
      determine don/doff data based at least in part on the first data and the relationship, wherein the don/doff data is indicative of the HMWD being donned or doffed; and
      responsive to the don/doff data, change operation of a component of the HMWD from a first mode to a second mode, wherein the first mode consumes a first amount of electrical power and the second mode consumes a second amount of electrical power that is different from the first amount.

4. The HMWD of claim 3, wherein the at least one electrode is positioned on the frame bridge of the front frame, the at least one electrode comprising:
   a first electrode having a left edge that is a first distance from a centerline of the front frame and a right edge that is a second distance from the centerline, wherein the first distance is greater than the second distance.

5. The HMWD of claim 3, the processor to further execute instructions to:
   determine a first value based on the first data, wherein the first value is less than a first threshold value;
   determine the second data is indicative of, as measured along a first axis, a change from:
      a first acceleration value that is less than a second threshold value,
      to a second acceleration value that is greater than the second threshold value and remains greater than the second threshold value for a first length of time; and
   wherein the don/doff data is indicative of the HMWD being doffed.

6. The HMWD of claim 3, the processor to further execute instructions to:
   determine the second data is indicative of:
      as measured along a first axis, a first change from:
         a first acceleration value that is less than a first threshold value,
         to a second acceleration value that is greater than the first threshold value and remains greater than the first threshold value for a first length of time;
      as measured along a second axis, a second change from:
         a third acceleration value that is less than a second threshold value,
         to a fourth acceleration value that is greater than the second threshold value and remains greater than the second threshold value for the first length of time; and
      as measured along a third axis, a third change from:
         a fifth acceleration value that is less than a third threshold value, to a sixth acceleration value that is greater than the third threshold value and remains greater than the third threshold value for the first length of time;
determine a first value based on the first data being less than a fourth threshold value; and
wherein the don/doff data is indicative of the HMWD being doffed.

7. The HMWD of claim 3, the processor to further execute instructions to:
determine a first value based on the first data is less than a first threshold value;
determine a second value based on the second data, wherein the second value is indicative of an acceleration with respect to a first axis of the IMU; and
determine the second value is less than a second threshold value;
wherein the don/doff data is indicative of the HMWD being donned.

8. The HMWD of claim 3, the processor to further execute instructions to:
determine a first value that is based on the first data, wherein the first value is associated with a first time;
determine the first value is greater than a first threshold value;
determine a second value based on the second data, wherein the second value is indicative of the HMWD having a second orientation with respect to vertical at the first time that is within the first range associated with being donned;
determine a third value that is based on the first data, wherein the third value is associated with a second time that is after the first time;
determine the third value is less than the first threshold value;
determine a fourth value based on the second data, wherein the fourth value is indicative of the HMWD having a third orientation with respect to vertical at the second time that exceeds the first range; and
wherein the don/doff data is indicative of the HMWD being doffed.

9. The HMWD of claim 3, the processor to further execute instructions to:
determine a first value based on the first data is greater than a first threshold value; and
send a command to the IMU to change from operating in the first mode to the second mode, wherein the second amount of electrical power is greater than the first amount of electrical power.

10. The HMWD of claim 3, further comprising:
a first hinge at a first side of the front frame;
a first temple connected to the first hinge, wherein the first temple comprises a first side that is proximate to a user while the HMWD is donned; and
a second electrode that is supported by the first temple and is proximate to the first side;
wherein the capacitive sensor circuitry is connected to the second electrode and determines third data; and
the processor to further execute instructions to:
determine the don/doff data based at least in part on the third data.

11. The HMWD of claim 3, further comprising:
a first side of the front frame that is proximate to a user while the HMWD is donned; and
a second electrode that is supported by the front frame and is proximate to the first side of the front frame;
wherein the capacitive sensor circuitry is connected to the second electrode and determines third data; and
the processor to further execute instructions to:
determine the don/doff data based at least in part on the third data.

12. The HMWD of claim 3, wherein the instructions to determine the don/doff data process the first data and the second data using a finite state machine.

13. A method comprising:
determining first data by measuring capacitance of a first electrode in a head-mounted wearable device (HMWD) at a first time;
determining second data using an inertial measurement unit (IMU) of the HMWD at a second time, wherein the second data is indicative of:
a first change in acceleration with respect to a first axis that is greater than a first threshold value; and
a second change in acceleration with respect to a second axis;
determining a first relationship between the first change and the first threshold value;
determining a second relationship between the second change and a second threshold value; and
determining, based at least in part on the first data, the second data, the first relationship, and the second relationship, don/doff data indicative of the HMWD being donned or doffed.

14. The method of claim 13, further comprising:
determining a first value that is based on the first data is less than a third threshold value;
determining that the second data is indicative of a transition from a first acceleration value that is less than a fourth threshold value to a second acceleration value that is greater than the fourth threshold value; and
wherein the don/doff data is indicative of the HMWD being doffed.

15. The method of claim 13, further comprising:
determining the second data is further indicative of: a third change in acceleration with respect to a third axis that is greater than a third threshold value;
determining a first value based on the first data is less than a fourth threshold value; and
wherein the don/doff data is indicative of the HMWD being doffed.

16. The method of claim 13, further comprising:
determining a first value based on the first data is less than a third threshold value;
determining a second value based on the second data, wherein the second value is indicative of an acceleration with respect to a first axis of the IMU; and
determining the second value is less than a fourth threshold value;
wherein the don/doff data is indicative of the HMWD being donned.

17. The method of claim 13, further comprising:
determining a first value that is based on the first data, wherein the first value is associated with the first time;
determining the first value is greater than a third threshold value;
determining a second value based on the second data, wherein the second value is indicative of the HMWD having a first orientation with respect to vertical at the first time that is within a first range associated with being donned;
determining a third value that is based on the first data, wherein the third value is associated with a third time that is after the first time;
determining the third value is less than the third threshold value;

determining a fourth value based on the second data, wherein the fourth value is indicative of the HMWD having a second orientation with respect to vertical at the second time that exceeds the first range; and wherein the don/doff data is indicative of the HMWD being doffed.

18. The method of claim 13, further comprising:

determining a first value based on the first data is greater than a third threshold value; and changing operation of the IMU from a first mode to a second mode, wherein the first mode consumes a first amount of electrical power and the second mode consumes a second amount of electrical power that is greater than the first amount of electrical power.

19. The method of claim 13, wherein the first electrode is proximate to a frame bridge of the HMWD, the method further comprising:

determining third data by measuring capacitance of a second electrode in a temple of the HMWD;

wherein the determining the don/doff data is further based at least in part on the third data.

20. The method of claim 13, further comprising:

determining third data by measuring capacitance of a second electrode in a front frame of the HMWD; and determining the don/doff data based at least in part on the third data.

\* \* \* \* \*